United States Patent
Nagata et al.

[15] 3,652,313
[45] Mar. 28, 1972

[54] PIGMENT DISPERSION FOR WATER THINNABLE PAINTS

[72] Inventors: Nobuyoshi Nagata, Hirakata-shi; Tsuguo Yamazaki, Nishinomiya-shi, both of Japan

[73] Assignee: Nippon Paint Co., Ltd., Oyoda-ku, Osaka, Japan

[22] Filed: Mar. 18, 1968

[21] Appl. No.: 714,113

Related U.S. Application Data

[63] Continuation of Ser. No. 435,034, Feb. 24, 1965, abandoned.

[30] Foreign Application Priority Data

Feb. 25, 1964 Japan.....................................39/9339
Sept. 8, 1964 Japan...................................39/50652

[52] U.S. Cl......................106/193 J, 106/193 R, 106/193 P, 106/197 R, 260/41 R, 260/41 B, 260/41 C, 260/231 A
[51] Int. Cl......................................C08b 27/08, C08f 45/08
[58] Field of Search................106/193, 193 I, 193 O, 197 R; 260/91.3 VA, 41, 231 A, 41 B, 41 C

[56] References Cited

UNITED STATES PATENTS 3,010,929  11/1961  Jones....................................260/29.6
3,053,676  9/1962  Higbee..............................106/193 I
3,093,603  6/1963  Gilchrist...............................106/193

OTHER PUBLICATIONS

Studebaker, in Kraus– " Reinforcement of Elastomers" – (Interscience) (N.Y.) (1965), page 326, T.S. 1925 k7.
Condensed Chemical Dictionary (6th Ed.) (Reinhold) (N.Y.) (1961), page 920.
Ott and Spulin– High Polymers, vol. 5, Cellulose (Interscience) (NY) (1954), pages 945–946.
Van Nostrand Chemist's Dictionary (Van Nostrand) (NY) (1953), page 560

*Primary Examiner*—Morris Liebman
*Assistant Examiner*—H. H. Fletcher
*Attorney*—Waters, Roditi, Schwartz & Nissen

[57] ABSTRACT

A pigment dispersion for blending with water-thinnable paints, comprising at least one pigment and at least 5 percent by weight of at least one member selected from the group consisting of water-soluble hydroxyalkyl celluloses, water-soluble, partially saponified polyvinyl acetates, water-soluble, partially etherified derivatives of said partially saponified polyvinyl acetates and of polyvinyl alcohol.

7 Claims, No Drawings

PIGMENT DISPERSION FOR WATER THINNABLE PAINTS

This is a streamlined continuation of application Ser. No. 435,034, filed Feb. 24, 1965 and now abandoned.

This invention relates to a pigment dispersion obtained by blending a large amount of one or more kinds of hydroxyalkyl celluloses and polyvinyl-alcohol derivatives, and with pigments. An object of this invention is to improve the dispersibility into water thinnable paints and to provide stable pigment dispersion during storage and handling. The water thinnable paints, mean those containing latex, emulsion or water soluble resins as film forming ingredients which will be colored.

The conventional pigment dispersions consist of pigment colors, water, surface active agents, and water miscible, high boiling solvents as the main ingredients and containing small amounts of preservatives, antifoaming agents, thickening agents and the like. If a thickening agent is used, one having a comparatively high viscosity as an aqueous solution is used only in a small amount. These pigment dispersions, except those containing large amounts of water miscible, high boiling solvents or surface active agents, are apt to dry up during storage and handling which lead to aggregation of the pigments, and accordingly the use of them are accompanied by such serious defects from a practical point of view as unevenness of color, reduction in tinting strength, and the like. In the case of the direct use of these pigment dispersions for toning procedures in the paint industry, the whole amount thereof is rarely used at one time when the container is opened and so generally, the remainder adhered to the outside and inside walls of the containers with each handling dry up upon exposure to the air and then mix in the paint as aggregated masses, the compounded products accordingly becoming non-homogeneous. There are small masses among the aggregated masses and it is hard to redisperse or to remove them from the system.

According to the present invention, there is provided a pigment dispersion, for blending with water-thinnable paints, which comprises at least one member selected from the group consisting of water-soluble hydroxyalkyl celluloses, water-soluble partially saponified polyvinyl acetates, and water-soluble partially etherified derivatives of such partially saponified polyvinyl acetates and of polyvinyl alcohol in a proportion of at least 5 percent, preferably 10–30 percent, by weight of the pigment in the dispersion. Said pigment dispersion has an excellent redispersibility even after being dried up. Further, said pigment dispersion does not have such defects as mentioned above.

Particularly, among conventional pigment dispersions, there is not any one of good dispersibility which contains, for example, such inorganic pigments of the iron oxide series as red oxide and iron oxide yellow or carbon black and the like.

Of course, redispersibility of these dried conventional pigment dispersions into the paints is extremely poor. However, since these pigments of iron oxide series are practically excellent in regard to resistance to discoloration and weather and are low-priced, superior pigment dispersions using them have been desired. This invention has solved the problem of difficult dispersibility.

Furthermore, application of this new method to conventional pigment dispersions enables the preparation of pigment dispersions showing a good dispersibility during storage and handling.

Typical examples of the thickening agents used for the aqueous paints are polyvinyl alcohol, casein, methyl cellulose, CMC (sodium carboxymethyl cellulose), polyacrylates, and alginates. Hydroxyalkyl celluloses are also usable for the same purpose, and in this case the amounts of the thickening agents to be contained in the aqueous paint are below three per cent by weight, usually 0.5 to 1.5 percent by weight based on the total pigments.

The improved pigment dispersions for paints of this invention are characterized in that they are applicable in common to various kinds of water thinnable paints without any hindrance. For instance, as shown in Example 1, the properties of emulsion paints vary depending upon the kinds thereof, including vinyl acetate, acrylic and styrene-butadiene polymers.

The improved pigment dispersions which are manufactured by this invention are independent of the said kinds and are applicable as well to all the kinds.

This is, in practical terms, one of the advantages from the viewpoints of ease of handling and the rationalization of production processes. Considering the water solubility, pH-property and stability in the viscosity of the aqueous solution during storage and handling, hydroxyethyl cellulose is most suitable for the purpose of this invention among the hydroxyalkyl celluloses.

Particularly, these properties do not vary even when hydroxyethyl cellulose is used in pigment dispersion and further contribute to the dispersion stability, toning property in the process of handlings, and the redispersibility after drying.

Next, the compounds known as polyvinyl alcohol are a complete saponification product of polyvinyl acetate, which is unsuitable from the viewpoints of its properties particularly to its poor resolubility.

On the contrary, in this invention, as the partial saponification product of polyvinyl acetate the commercially available partial saponification products of polyvinyl acetates having a saponification degree of approximately 80 to 90 percent and, particularly, polyvinyl alcohols or a partial saponification product of polyvinyl acetate, a portion of whose hydroxyl groups art reacted with lower alkylene oxides, are preferably used. For example, hydroxyethyl etherified polyvinyl alcohols obtained by addition of ethylene oxide to polyvinyl alcohols show an increased hydrophilicity and for example, when the degree of etherification is above 10 percent based on the total amount of hydroxyl groups, the polyvinyl alcohol etherified by ethylene oxide is readily soluble in water at room temperature and accordingly by using same, a pigment dispersion for the paints of this invention can be obtained. The improved pigment dispersions for paints of this invention are required to contain fundamentally a large amount of pigment colors, to have good dispersibility into the substances to be mixed, and the compositions prepared by mixing them are required to have nearly the same property as that of the original paints.

The improved pigment dispersions for paints of this invention contain ingredients readily soluble in water in a suitable quantity compared with the pigments, and have a great tinting strength. These dispersions are usually employed in a ratio below 20 percent by weight based on the original paint. In other words, in the case of toning of paints, the objects can be usually attained by adding the said dispersion in a ratio below 10 percent by weight to white bases or original bases of any kind of water thinnable paints.

This invention is based on the discovery that an improved pigment dispersion which shows a good redispersibility even when dried up can be obtained and is more easily handled than those in the conventional pigment dispersions which are manufactured by compounding a large quantity of water miscible, high boiling solvents or surface active agents and the like. Particularly, it is characterized in that the properties of the obtained compositions are not different from those of the substances to be mixed.

Hydroxyalkyl celluloses used in this invention include such water soluble cellulose derivatives produced by addition of ethylene oxide and propylene oxide to cellulose as hydroxyethyl cellulose, hydroxyethyl hydroxypropyl cellulose and hydroxypropyl cellulose.

Polyvinyl alcohol derivatives readily soluble in water and used in this invention mean those having a saponification degree of approximately 80 to 90 percent which are generally available commercially as the partial saponification product of the above-mentioned polyvinyl acetate, hydroxyalkyletherified polyvinyl alcohols which are produced by adding such lower alkylene oxides as ethylene oxide and propylene oxide to the above-mentioned partially saponified polyvinyl alcohols or polyvinyl alcohol obtained by the complete saponification or the condensation products of polyvinyl alcohol and carbonyl compounds.

However, the pastes containing pigments for textile printing disclosed in the specifications of Japanese Pat. No. 289,852 and 315,094 are mentioned as usable in a large amount compared with the pigments by use of the substances, which have been described as the above-mentioned thickening agent, as protective colloid, but this invention is different from these and has the following characteristics:

1. The two patents mentioned above recommended methyl cellulose, casein, and sodium carboxymethyl cellulose as a suitable protective colloid, while in this invention they are not appropriate in the aspect of efficiency as will be illustrated in Example 1.

2. This invention recommends particularly water soluble hydroxy alkyl cellulose, while in the aforementioned two patents it is thought similar to tragacanth gum, gelatin, starch solution, alginic acid salts, polyvinyl alcohol, and the like without giving any peculiar distinction, and further there is no description concerning polyvinyl alcohol derivatives readily soluble in water at room temperature.

3. Both patents teach that: "Pigment dispersion requires in general a large amount of surface active agents and protective colloid in the disperse system of pigment." The improved pigment dispersion of this invention has distinguishing features different from the above in that the redispersion after drying up is easy, and it is not preferable to compound a large quantity of surface active agents and water miscible, high boiling solvents, because it leads to the deterioration in the wet abrasion resistance and the alkali resistance and the durability of paints.

As to the water soluble hydroxyalkyl cellulose, a further detailed description is as follows:

Cellulose is an aliphatic polyalcohol and its etherification is generally carried out in alkaline state. In other words, cellulose is allowed to react with ethylene oxide, propylene oxide or ethylene chlorhydrin and the like in the presence of alkali to give compounds having ethereal bonds formed between the said oxides and hydroxyl groups, which are contained in the glucose residues of cellulose, such as ethylene glycol monoether bond, propylene glycol monoether bond, diethylene glycol monoether bond, dipropylene glycol monoether bond or polyethylene glycol monoether bond, polypropylene glycol monoether bond and the like.

Further, water soluble cellulose derivatives, strictly speaking, hydroxyalkyl methyl cellulose, the alkali salts of hydroxyalkyl carboxymethyl celluloses, and the like, which are obtained by using methyl chloride, ethyl chloride, sodium chloroacetate, etc. together with ethylene oxide, propylene oxide, ethylene chlorhydrin and the like in the aforementioned etherification reaction of cellulose, whereby a portion of the hydroxyl groups in cellulose are substituted by methoxy, ethoxy or —OCH$_2$COONa radicals and ethereal bonds such as —OCH$_2$CH$_2$OH and —OC$_3$H$_6$OH, are included in the water soluble cellulose derivatives employed in this invention.

However, the effects of this invention decrease with the increasing etherification of the cellulose derivatives by methyl chloride, ethyl chloride or sodium monochloroacetate, etc. This can be elucidated in such a way that the celluloses etherified by ethylene oxide or propylene oxide and the like, different from the cases of methoxy, or ethoxy, etc. are stronger in the surface active agent-like property, and, accordingly, when they are used in pigment dispersion, the dispersion effect is greater.

In addition, it is expected that the alcoholic methylol radical (—CH$_2$OH) contained in water soluble hydroxyalkyl cellulose or hydroxyalkyl etherified polyvinyl alcohols, etc., when emulsion or water soluble resins such as N-methylol melamine resin derivatives, N-methylol urea resin derivatives and polymers containing N-methylol radicals, particularly contain N-methylol radical upon heating, form intermolecular bridge structures by heat treatment at a temperature of 100° to 200° C. and films of good water resistance and durability are formed.

Pigments which may be used in the process of the invention may be of either the inorganic or organic type. There are included, for example, such inorganic pigments as titanium dioxide, carbon black, cadmium red, red iron oxide, and cadmium yellow; such organic pigments as permanent red, Hanza yellow, phthalocyanine green, and phthalocyanine blue; or colanyl and pigmosol pigments, EM color and the pigments employed in the conventional pigment dispersion such as dispersed pastes for emulsion paints.

Furthermore, fillers such as calcium carbonate, talc, clay, silica powder, and mica powder may be used together with these pigment colors.

The surface active agent is selected from various kinds of surface active agents in such a way that it has no hindrance to various uses and particularly can provide a stable dispersion of fine particles even at higher concentrations of the pigments. For example, nonionic surface active agents include polyoxyethylene alkyl ethers, polyoxyethylene aliphatic acid esters, polyoxyethylene alkyl phenol ethers and the like, and anionic surface active agents include sodium alkyl naphthalene sulfonate, sodium alkyl benzene sulfonates, and high molecular polycarboxylic acids as the main component, and the like.

As wetting agents, water miscible solvents of high boiling points, particularly, glycols and the alkyl esters or alkyl ether derivatives thereof are used. For example, ethylene glycol, propylene glycol, polypropylene glycol, butylene glycol, cellosolve acetate, butyl carbitol acetate, and the like can be used. In some of the conventional pigment dispersions, a method for preventing the drying up during storage and handling is employed, which comprises using these surface active agents or water miscible, high boiling solvents as the main constituent. But the remainder stuck to the walls of containers and around the outlet dry up gradually with the lapse of time, or a phenomenon of film formation on the surface is observed and accordingly the redispersion thereafter becomes quite difficult.

Fundamentally speaking, the use of large amounts of surface active agent and water miscible, high boiling solvent is not preferable because it results in the deteriorations in the wet abrasion resistance, alkali resistance, and durability of the paints. One of the most suitable uses of hydroxyalkyl cellulose will be described below.

Hydroxyalkyl celluloses employed in this invention are preferably in a state of complete dissolution in the pigment dispersion.

A description will be given in the following by using commercial hydroxyethyl cellulose as an example. Hydroxyethyl celluloses of which two percent by weight aqueous solution has a viscosity above 1,000 cps. at a temperature of 20° C. remain undissolved by the usual solution procedures under stirring and so the swollen fine particles can be apparently observed with the eye, some of which can not dissolve completely even when stirred for many hours. Hydroxyethyl cellulose of which two per cent by weight aqueous solution has a viscosity below 30 cps. measured at a temperature of 20° C. dissolves completely at room temperature, no undissolved substances being observed.

In addition, hydroxyethyl cellulose of lower viscosity is superior to that of higher viscosity in the dispersing effect towards pigments.

The requisite amounts of hydroxyalkyl celluloses vary somewhat depending upon the kinds and amounts of the additives contained in the pigment dispersion of this invention, but amounts sufficient to cover the pigment particles are required.

As to the amounts employed, one kind or more than two kinds of hydroxyalkyl celluloses are used in an amount above five per cent by weight, preferably, 10 to 30 percent by weight based on the pigments. It is suitable to employ hydroxyalkyl celluloses of which a 2 percent by weight aqueous solutions has a viscosity below 300 cps. measured at a temperature of 20° C.

The improved pigment dispersion satisfying such conditions attains the primary objects when applied to paints. The remainder adheres closely to the wall of the container during each handling and is gradually dried up, but is readily redispersed by stirring the paint for a short time. Accordingly, such various defects resulting from drying up and aggregation as observed in the conventional pigment dispersions can be avoided.

The use of polyvinyl alcohol derivatives of this invention are similar to those of the aforementioned hydroxyalkyl celluloses. For example, a 5 percent by weight aqueous solution of commercial polyvinyl alcohol having a degree of saponification approximately 80 to 90 percent shows a viscosity below 200 cps. measured at a temperature of 20° C. In the case of hydroxyalkyl cellulose, those having the above-defined viscosity are adequate. These conditions are sufficiently met and further, the objects can be sufficiently attained by the use of polyvinyl alcohol derivatives. In addition, it is desirable to add a small amount of the water miscible, high boiling solvents as aforementioned in order to carry out the redispersion in a short time. However, these water miscible, high boiling solvents can not be expected to influence the dispersing effect to a great degree, but on the contrary, they are strikingly effective for retarding both the drying and solidification of the pigment dispersion in the course of manufacture or use.

This invention is illustrated by the following examples. The amounts compounded are represented by parts by weight.

Example 1

To 40 parts of a mixture obtained by mixing 5 kinds of commercial (conventional) pigment dispersions optionally selected as shown in the followings in an equal amount (pigment, 50 parts; hereinafter referred to as the mixture), 1. Permanent Red FGR Colanyl
2. Permanent Yellow HR Colanyl
3. Heliogen Green GN Colanyl
4. Heliogen Blue B Colanyl
5. Imperon Black K-BG Highly Conc.

each 50 parts of 5 percent aqueous solutions of hydroxyethyl cellulose, methyl cellulose and CMC 5 parts of diethylene glycol and 5 parts of 10 percent ($\bar{p}$ = 12) of polyoxyethylene nonyl phenol ether were added. The obtained mixture was stirred to uniformity and the resulting homogenous mixture is referred to as the sample dispersion. The next examinations were carried out by use of the sample dispersion, which was spread on a glass plate to a thickness of 5 mils and then dried in an oven at a temperature of 60° C. for 1 hour, as the sample dried up. To each 100 parts of white emulsion paint of the usual commercial polyvinylacetate, polyacrylic, and polystyrene-butadiene types, each 2.5 parts of the sample dispersion and the sample dried up which contain same amount of pigments were added. The resulting mixtures were stirred with a glass stick for 10 minutes and then the toning property was examined to give the results as illustrated in the following table.

1. Color is near 7.5 P 7/2 when represented by Munsell's system.
2. This means the color stripes which are, in case of spreading with a brush, produced along the course of the brush owing to the grind of the aggregated pigment masses by shearing force of the brush.
3. Standard of decision. ⊚: excellent; ○: good; △: usable limit; ×: practically inferior, ××: practically unusable. As the results show, the sample dispersions containing methyl cellulose and CMC are attendant with some hindrances to the practical use of the emulsion paints. However, the sample dispersions employing hydroxyethyl cellulose are superior to said mixtures. There are extremely remarkable differences in the said property of the dried up samples, the worst one being the said mixture.

The mixtures containing methyl cellulose and CMC are considerably better than the said mixtures but they are still insufficient for practical use. On the contrary, those employing hydroxyethyl cellulose show extremely excellent properties and are usable in common for various kinds of the emulsion paints even after being dried up. The addition of hydroxyethyl cellulose used in this example is 12.5 per cent based on the parts of the pigments in the sample dispersion.

Example 2

To 45 parts of Imperon Black K-BG Highly Conc. Pigments, 40 per cent, 50 parts of 5 percent aqueous hydroxyethyl cellulose solution (viscosity measured at 20° C.: 150 cps.) was added, and blended by use of a stirrer so as not to bubble. To the obtained mixture, five parts of diethylene glycol were further added and then stirred, whereby 100 parts of a fluid pigment dispersion having a viscosity of approximately 80 K.U. (measured by use of Stormer's viscometer at a temperature of 20° C.) was obtained. This dispersion can be used for toning various kinds of water emulsion paints without any hindrance and particularly the defects due to drying up can be avoided (by using this dispersion). In this example, hydroxyethyl cellulose is used in an amount of 13.9 percent based on the pigments.

Example 3

A vibro-energy mill was charged with a mixture of 30 parts of Tekka Red, 60 parts of 5 percent aqueous hydroxyethyl cellulose solution (viscosity at a temperature of 20° C.: 150 cps.), 0.5 parts of Demol EP (Anionic surface active agent of high molecular polycarboxylic acid salts), 0.5 parts of polyoxyethylene nonyl phenol ether ($\bar{p}$ = 12) and 9 parts ethylene glycol and then was operated for 20 hours, whereby the desired pigment dispersion was obtained. In this case, the addition of hydroxyethyl cellulose is 10 percent on the basis of the pigments.

In this example, the dispersion which does not contain 9

TABLE.—EXAMINATIONAL RESULTS OF TONING PROPERTY [1]

| Kind of paint | Sample | Exam. item | Additives | | | |
| --- | --- | --- | --- | --- | --- | --- |
| | | | Hydroxyethyl cellulose | Methyl cellulose | CMC | Control (the mixture) |
| Polyvinyl acetate types | Sample dispersion | Color uniformity | △ [3] | × | ○ | ○ |
| | | Touch up | ○ | × | × | △ |
| | | Stripe [2] | ⊚ | ⊚ | ⊚ | ⊚ |
| | | Tinting strength | ○ | △ | △ | ○ |
| | Sample dried up | Color uniformity | ○ | ×× | ○ | ×× |
| | | Touch up | ○ | × | × | ×× |
| | | Stripe | ⊚ | ×× | × | ×× |
| | | Tinting strength | ○ | △ | × | ×× |
| Polyacrylic types | Sample dispersion | Color uniformity | ○ | ○ | ○ | ○ |
| | | Touch up | ○ | ⊚ | △ | ○ |
| | | Stripe | ⊚ | ⊚ | ⊚ | ⊚ |
| | | Tinting strength | ⊚ | △ | △ | ○ |
| | Sample dried up | Color uniformity | ○ | ○ | ○ | ×× |
| | | Touch up | ○ | × | × | ×× |
| | | Stripe | ⊚ | × | × | ×× |
| | | Tinting strength | ○ | × | △ | ×× |
| Polystyrene butadiene types | Sample dispersion | Color uniformity | ○ | ○ | ○ | ○ |
| | | Touch up | △ | △ | △ | × |
| | | Stripe | ⊚ | ⊚ | ⊚ | ⊚ |
| | | Tinting strength | ○ | ○ | ○ | △ |
| | Sample dried up | Color uniformity | ○ | ○ | ○ | ×× |
| | | Touch up | △ | × | △ | ×× |
| | | Stripe | ⊚ | × | × | ×× |
| | | Tinting strength | ○ | ○ | ○ | ×× | parts of ethylene glycol can also attain the object of this invention.

Example 4

To 30 parts of Imperon Yellow KR Extra Conc. (pigment, approximately 50 percent;), 65 parts of 5 percent (by weight) aqueous solution of partially saponificated polyvinyl alcohol (degree of polymerization: ca. 600; degree of saponification: 88 percent) and 5 parts of diethylene glycol were added and mixed well. The obtained pigment dispersion readily disperses into various kinds of the emulsion paints even after being dried up and further, the stability after 3 months storage is excellent.

The amount of partially saponified polyvinyl alcohol used in this example is about 22 percent based on the pigments.

Example 5

To each of 40 parts of Tekka Red and Tekka Yellow (both, iron oxide series inorganic pigment) in pot mills, 54 parts of 10 percent aqueous solution of hydroxyethyl etherified polyvinyl alcohol (degree of polymerization: ca. 1,000; degree of saponification: 99 percent; etherification degree: 15 percent), 5 parts of diethylene glycol, and one part of 25 percent aqueous solution of a dispersing agent (sodium polycarboxylate) were added; and then the mills were operated for 16 hours to afford improved pigment dispersions of reddish brick-color and yellow ocher color, respectively. In this example, the amount of hydroxyethyl etherified polyvinyl alcohol used is 13.5 percent based on the pigments. To the pigment dispersions of this invention, such other additives than the aforementioned raw materials as emulsions or water soluble resins, antifoaming agents, and preservatives may be added so far as they prove no hindrance to the efficiencies. As antifoaming agent, for example, Nopco, (Balab bubble breaker), tributyl phosphate and the like are illustrated. Monim, Molden and the like are usable as preservatives.

We claim:

1. A mixture, for blending with water-thinnable paints, consisting essentially of at least one pigment and 10–30 percent by weight, based on the weight of the pigment, of at least one member selected from the group consisting of water-soluble hydroxyalkyl celluloses, water-soluble, partially saponified polyvinyl acetates, and water-soluble, partially etherified derivatives of said partially saponified polyvinyl acetates and of polyvinyl alcohol.

2. The mixture of claim 1 wherein the water-soluble hydroxyalkyl cellulose is water-soluble hydroxyethyl cellulose.

3. The mixture of claim 1 wherein the water-soluble hydroxyalkyl cellulose is one of which a 2 percent aqueous solution has a viscosity below 300 cps. at a temperature of 20° C.

4. The mixture of claim 1 wherein the pigment is selected from the group consisting of carbon black and iron oxide series inorganic pigments.

5. The mixture of claim 1 wherein the pigment is selected from the group consisting of titanium dioxide, cadmium red, red iron oxide, cadmium yellow, Permanent red, Hanza yellow, phthalocyanine green and phthalocyanine blue.

6. A mixture for blending with water-thinnable paints consisting essentially of at least one pigment and 10–30 percent by weight, based on the weight of the pigment of water-soluble hydroxyethyl cellulose.

7. The mixture of claim 1 wherein said member is at least one water-soluble hydroxyalkyl cellulose.

* * * * *